_2,965,492_

PROCESS FOR RAPID MANUFACTURE OF CHEESE PRODUCT

Howard E. Bauman, Minneapolis, John L. MacMillan, Hopkins, and Jolyon A. Stein, Minneapolis, Minn., assignors to The Pillsbury Company, a corporation of Delaware No Drawing. Filed Nov. 18, 1957, Ser. No. 696,965

13 Claims. (Cl. 99—116)

This invention relates to the manufacture of a cheese product, and more particularly to a process for rapidly manufacturing various products having characteristic cheese flavoring.

In the conventional production of cheese, a milk component has lactic culture, rennet extract and coloring added thereto, following which the mixture is fermented approximately four to six hours. A curd structure becomes developed by the fermentation, and the whey or liquid component is interspersed in pockets throughout the fibrous curd. The product is cut into cubes and folded and worked in such a manner as to make possible the removal of the whey by draining and without breaking down the curd structure in the first instance. After the initial drainage of whey, the curd is comminuted and drained again, following which it is packed into forms and aged for approximately six weeks or longer, depending upon the flavor itself. The flavoring can be inserted or dispersed throughout the mass and may include mixtures of bacteria and enzymes to effect various aging processes. Salt is usually added to the cheese at the time it is packed into forms. When the proper flavor is developed, the fermented product is cut and packaged. Most of the water soluble vitamin B complexes found in whole milk are removed in the whey as are the greater portion of milk sugars. In producing a dried cheese product such as that normally called powdered or grated cheese, it becomes necessary to take the desired aged cheese and to develop a slurry by adding water, following which the slurry is spray-dried down to from eight percent to seventeen percent moisture to obtain the ultimate product. Alternatively the finished cheese may be dried to the desired moisture level by some suitable method and subsequently comminuted.

The instant invention is concerned with preserving valuable food components which exist in skim milk or reconstituted milk made from non-fat milk solids and, at the same time, functions in a much shorter period of time to achieve the end result of a dried cheese product. Briefly, the invention consists in fermenting and developing the desired cheese flavor in a casein fluid product such as reconstituted nonfat milk solids, but for such length of time, not exceeding but a few hours, and under such conditions as will not develop a system of curds and whey. The entire mass is then stirred into a fairly homogeneous fluid mass and rapidly dried down to a pulverulent product having a moisture content of approximately three percent and being the equivalent in eating and flavoring properties to the dried cheese product which normally requires weeks of preparation and reworking to obtain the ultimate dried product.

A characteristic of the process of the instant invention is that flavor development can be easily controlled and terminated at the desired time by drying the product, particularly if the product is spray-dried at a temperature and to a degree of dryness which will prevent further bacterial and enzymatic action.

The instant invention has, as an important objective, to provide a process by which a dried cheese product can be manufactured inexpensively and quickly.

More specifically, it is an object of the invention to provide a process for the production of a dried cheese product of desired flavor with the elimination of several stages conventionally employed in the production of dried cheese products.

A still further object of the invention is to provide a process for making a dried cheese product in which none of the components are separated from the starting material from the beginning to the end of the procedure, and wherein natural components such as milk sugars, and vitamins are retained, and utilized during intermediate steps of the process.

These and other objects and advantages of this invention will appear more fully as the specification progresses.

In practicing our invention, we start with a casein source which may be whole milk, skim milk, dried milk, non-fat dry milk solids or similar substances which are retained or made into fluid form capable of being fermented. In some instances, such products as commercial non-fat milk solids have been previously pasteurized and, hence, do not require such procedure. However, in other cases, it is deemed advisable to pasteurize the fluid starting material so as to prevent the growth of undesirable bacteria which may produce off-flavors during the process. If the initial casein product does not contain fat, we may add an edible fat which improves the physical characteristics of the ultimate product and also furnishes a source of material for fat-splitting enzymatic reaction where desired. We have also found that the presence of fat globules in a dried cheese product tend to retain volatile flavors and, hence, render the product more flavorsome.

In order to increase the fat surface for hydrolyzing, we homogenize the fluid casein product with its fat content and thereby suspend fat particles in colloidal form throughout the product. The fluid material containing evenly dispersed fat and casein is then inoculated with flavor-producing substances. Considerable latitude is possible in flavoring the material as is well known to cheese markers, and it is thought that there need be no elaboration on the various types of micro-organisms and enzymes which may be used in combinations for producing a multiplicity of cheese flavors. However, as a further short-cut in the process of the instant invention, we have found that commercial cheeses such as cheddar, roquefort, parmesan and romano can be utilized to furnish micro-organisms and enzymes. It is understood, of course, that other cultures and enzymes can be added to effect various combinations of incubation and fermentation with the objective in view of obtaining optimum growth of the desired flavor-producing substances in the shortest period of time. After the development period and prior to the formation of a curd system, the entire mass is stirred so as to produce a uniform mass. The fluid product is then rapidly dried down to a moisture level usually in the neighborhood of three percent so as to instantaneously stop further bacterial and enzymatic action. Although any conventional drying process may be used, we prefer spray-drying at temperatures above room temperatures since the product in its natural condition is peculiarly adapted to spray-drying and the dried product produced by such procedure has a commercial form which needs no further attention. Further, the spray-drying procedure is adaptable to large scale production at a low cost and with procedures which have been well developed in the art.

The following are specific examples which illustrate a variety of materials and procedures for obtaining dried cheese products having different characteristic flavors.

Example I

The product, according to this example, utilizes skim milk and non-fat dry milk solids. Emulsifiers have been added to the oil and the oil homogenized so that a stable emulsion is present during the fermentation. The cheddar cheese was added to the fermentation mixture to serve as a natural source of bacteria, enzymes and cheese flavor. The formula is as follows:

| | Percent |
|---|---|
| Skim milk | 76.50 |
| Non-fat dry milk solids | 7.12 |
| Peanut oil | 12.05 |
| Emulsifier | 2.19 |
| Cheddar cheese | 2.14 |
| | 100.00 |

The non-fat dry milk solids were dissolved in the skim milk by gentle agitation. The mixture was then heated to 140° F. and the previously melted mixture of peanut oil and emulsifiers were added. This slurry was then homogenized using a first stage pressure of 2500 pounds per square inch gauge and second stage pressure of 800 pounds per square inch gauge. The emulsion was cooled to 60° F. and the grated cheese was added and thoroughly dispersed. The initial pH of this product was 6.1.

The emulsion was inoculated with 0.5%, by weight, of a lactic starter culture. The fermentation was allowed to proceed for eight hours at 75° F. The pH at the end of the fermentation period was 4.9. The fermented material was spray-dried using a pilot plant size spray dryer. The dryer was operated under the following conditions:

| | ° F. |
|---|---|
| Inlet air temperature | 310 |
| Upper chamber temperature | 175–180 |
| Outlet air temperature | 150–155 |

Example II

In this example, the product is similar to that formed by the process of Example I, but illustrates the use of artificial flavor and color. The formula is as follows:

| | Percent |
|---|---|
| Skim milk | 76.50 |
| Non-fat dry milk solids | 7.12 |
| Peanut oil | 12.05 |
| Emulsifier | 2.19 |
| Cheddar cheese | 2.14 |
| | 100.00 |

The process for making the product of Example II was identical to that used for Example I, except that, just prior to spray-drying, color and flavor were added in the following amounts:

| | Percent |
|---|---|
| Artificial cheddar cheese flavor | 0.035 |
| Cheese color (Annatto extract) | 0.045 |

Example III

Example III illustrates the use of rennet as a means of modifying the character of the rehydrated product. Rennet extract contains the proteolytic enzyme, rennin. This enzyme hydrolyzes casein to produce paracasein. This produces a smoother product on hydration. The formula and process are shown below:

| | Percent |
|---|---|
| Skim milk | 90.75 |
| Peanut oil | 7.38 |
| Peanut monoglyceride | .66 |
| Cheddar cheese | 1.21 |
| | 100.00 |

The fermentation base was prepared in the same manner as described in Example II. It was then inoculated with 0.75%, by weight, of a lactic starter culture. Rennet extract (3 ml. per 100 pounds of base) was also added at this time. The fermentation was allowed to proceed at room temperature (70° F.) for eight hours. The fermented material was then spray-dried using the same procedure described in Example II.

Example IV

This is an example of an Italian-type cheese product made by our process. The cheese added to the fermentation base provides a source of enzymes, bacteria and flavor typical of Italian cheese. The peanut oil used as a fat source has been partially replaced with butter oil. This provides a source of low molecular fatty acids which are typical flavoring ingredients in Italian cheese. A lipolytic enzyme (Capalase KL) has been added to hydrolyze the fat and form free fatty acids. Sodium citrate has also been added to modify the consistency of the rehydrated product. The citrate radical has a complexing action on the calcium contained in the casein or paracasein. This results in a much smoother rehydrated product. The product is shown below:

| | Percent |
|---|---|
| Skim milk | 76.50 |
| Non-fat dry milk solids | 7.12 |
| Peanut oil | 6.53 |
| Butter oil | 6.54 |
| Peanut monoglycerides | 1.17 |
| Cheese (1 to 1, Romano, Parmesan) | 2.14 |
| | 100.00 |

The fermentation base was prepared in the same manner as described in Example II. It was then inoculated with the following materials:

| Lactic starter culture | 0.25% (on total weight basis). |
|---|---|
| Rennet extract | 3 ml. per 100 lbs. of base. |
| Capalase KL | 4% (on solids basis). |
| Sodium citrate | 170 ml. per 1000 lbs. of base. |

The mixture was allowed to ferment for six hours at 80° F. The material was then spray-dried using the same procedure as described in previous Example II.

Example V

This is an example of the use of our process in conjunction with an enzyme preparation obtained from penicillium roqueforti. In this particular case, no mold growth occurred during the fermentation. However, actively growing mycelium may be added to achieve the same result. The formula is shown below:

| | Percent |
|---|---|
| Condensed skim milk | 62.2 |
| Butter oil | 37.8 |
| | 100.00 |

The fermentation was inoculated with one percent, by weight, of a lactic starter culture. The lactic fermentation was allowed to continue for twelve hours at 75° F. At the end of this period, the butter oil was added and the mixture homogenized. To this emulsion, three percent, by weight, of a liquid mycelium-free preparation of penicillium roqueforti was added. The incubation was allowed to continue for four hours at 45° F. The material was then spray-dried under conditions described in Example I.

In each of the foregoing examples, it will be observed that the ultimate dried cheese product has been completely manufactured by a simplified procedure, the entire time for which does not exceed a single day as compared to the much more expensive and tedious conventional procedure which may consume weeks or even months of time for producing the equivalent dried cheese product.

What we claim is:

1. A process for the rapid manufacture of a dried cheese product of predetermined flavor other than that produced by a coagulant which consists in the successive steps of inoculating a fluid milk product mixture with a coagulant and with means capable of synthesizing said predetermined flavor in cooperation with the constituents of said mixture, and incubating and fermenting the inoculated fluid mixture to coagulate same and synthesize said predetermined flavor.

2. A process for the rapid manufacture of a dried cheese product of predetermined flavor other than that produced by a coagulant which consists in the successive steps of inoculating a fluid milk product mixture with a coagulant and with means capable of synthesizing said predetermined flavor in cooperation with the constituents of said mixture, and incubating and fermenting the inoculated fluid mixture until said predetermined flavor has been completely synthesized in said fluid mixture, and treating the fluid mixture to arrest and prevent further fermentation and flavor development therein.

3. A process for the rapid manufacture of a dried cheese product of predetermined flavor other than that produced by a coagulant which consists in the successive steps of inoculating a fluid milk product mixture with a coagulant and with means capable of synthesizing said predetermined flavor in cooperation with the constituents of said mixture and incubating and fermenting the inoculated fluid mixture until said predetermined flavor has been completely synthesized in said fluid mixture, and drying said fluid mixture and preventing further fermentation thereof, said dried product containing all of the food constituents of said fluid mixture.

4. A process for the rapid manufacture of a dried cheese product of predetermined flavor other than that produced by a coagulant which consists in the successive steps of inoculating a fluid milk product mixture containing natural milk sugars with a coagulant and with means capable of synthesizing said predetermined flavor in cooperation with said natural milk sugars, and incubating and fermenting the inoculated fluid mixture to coagulate same and synthesize said predetermined flavor.

5. A process for the rapid manufacture of a dried cheese product of predetermined flavor other than that produced by a coagulant which consists in the successive steps of inoculating a fluid milk product mixture containing substantially all of the natural food constituents of milk with a coagulant and with means capable of synthesizing said predetermined flavor in cooperation with the constituents of said mixture, and incubating and fermenting the inoculated fluid mixture until said predetermined flavor has been completely synthesized in said fluid mixture, and drying said fluid mixture and arresting further flavor development therein, said dried product containing all of the food constituents of said fluid mixture.

6. A process for the rapid manufacture of a dried cheese product of a predetermined flavor other than that produced by a coagulant which consists in the successive steps of inoculating a fluid milk product mixture containing natural milk sugars and an edible fat with a coagulant and with means capable of synthesizing said predetermined flavor in cooperation with said natural milk sugars and said edible fat, and incubating and fermenting the inoculated fluid mixture to coagulate same and synthesize said predetermined flavor therein.

7. A process for the rapid manufacture of a dried cheese product which consists in inoculating a fluid milk product mixture with a coagulant and with a cheese containing flavor producing bacteria and enzymes, fermenting the inoculated fluid mixture and permitting said bacteria and enzymes to cooperate with the constituents of said mixture to synthesize the typical flavor of said cheese in said mixture, stirring the mixture to disperse and maintain the solids in suspension, and drying the fermented and stirred fluid mixture rapidly to a moisture content in which further fermentation of the dried product does not take place, all of the food constituents in the original mixture being maintained therein during the entire process and also being present in the finished dried product.

8. A process for the rapid manufacture of a dried cheese product of predetermined flavor other than that produced by a coagulant which consists in the successive steps of intermixing edible fat with skim milk and homogenizing the mixture, inoculating the mixture with a coagulant and with means capable of synthesizing said predetermined flavor in cooperation with the constituents of said mixture, incubating and fermenting the inoculated fluid mixture until the development of said predetermined flavor is completed therein, stirring the fluid fermented mixture to disperse and maintain the solids in suspension, and drying said fermented mixture rapidly and stopping further flavor producing bacterial and enzymatic action in the dried product.

9. A process for the rapid manufacture of a dried cheese product of predetermined flavor other than that produced by a coagulant which consists in the successive steps of intermixing non-fat milk solids, water and an edible fat, and forming an homogeneous mixture thereof, inoculating the homogeneous mixture with a coagulant and with means capable of synthesizing said predetermined flavor from the constituents of said mixture, incubating and fermenting the inoculated fluid mixture until the synthesization of the predetermined flavor is substantially completed therein, and maintaining said mixture in fluid state during the entire fermentation step, and drying rapidly to a fermentation arresting moisture content.

10. A process for the rapid manufacture of a dried cheese product which consists in the successive steps of inoculating a fluid milk product mixture with a coagulant and means for synthesizing a characteristic cheese flavor other than that flavor normally produced by a coagulant, fermenting the inoculated fluid mixture and substantially completing the synthesization of said characteristic cheese flavor in the same and preventing any substantial separation of curd and whey in the fluid mixture during the synthesization of said characteristic cheese flavor, and maintaining the mixture in fluid condition during the entire fermentation and flavor development period, stirring the fermented fluid mixture to disperse and maintain the solids in fluid suspension and upon completion of the development of said characteristic cheese flavor drying the fluid mixture rapidly to stop further fermentation in the dried product.

11. A process for the rapid manufacture of a dried cheese product of predetermined flavor other than that normally produced by the coagulant which consists in the successive steps of inoculating a fluid milk product mixture containing substantially all of the natural food constituents thereof with a coagulant and with means capable of synthesizing said predetermined flavor, incubating and fermenting the inoculated fluid mixture until development of the predetermined flavor is substantially completed in the fluid mixture which is maintained in fluid condition during the entire fermentation and development of cheese flavor, stirring the mixture to disperse and maintain the solids in suspension, and warming and spray drying the fermented and flavor developed fluid mixture to a moisture level of about 3% to form a dried cheese product having a fully developed predetermined flavor and substantially incapable of further fermentation.

12. A non-aging process for the rapid manufacture of a dried cheese product of predetermined characteristic typical cheese flavor which consists in the successive steps including inoculating an homogeneous fluid milk product mixture containing the natural milk sugars and fat with a coagulant and a cheese containing typical flavor synthesizing micro-organisms and enzymatic substance capable of synthesizing said typical cheese flavor in cooperation with the constituents of said mixture, incubating and fermenting the inoculated fluid mixture and maintaining said mixture in fluid state until the development of the typical cheese flavor desired is completed in the fluid mixture, and drying the fluid mixture rapidly upon completion of the development of said predetermined typical cheese flavor to form a dried cheese product substantially incapable of further fermentation or ripening.

13. The process of claim 12 in which the homogenized fluid mixture includes an emulsifying agent that promotes an oil and water emulsion.

References Cited in the file of this patent
UNITED STATES PATENTS

| | | |
|---|---|---|
| 939,138 | Just | Nov. 2, 1909 |
| 1,491,166 | Peebles | Apr. 22, 1924 |
| 2,604,405 | Petersen | July 22, 1952 |
| 2,682,469 | Stuart et al. | June 29, 1954 |
| 2,719,793 | Page et al. | Oct. 4, 1955 |

OTHER REFERENCES

Food Technology, vol. 10, #3, March 1956, pages 138–141.

UNITED STATES PATENT OFFICE
CERTIFICATION OF CORRECTION

Patent No. 2,965,492            December 20, 1960

Howard E. Bauman et al.

It is hereby certified that error appears in the above numbered patent requiring correction and that the said Letters Patent should read as corrected below.

In the grant (only), line 13, for "The Pittsbury Company, its successors" read -- The Pillsbury Company, its successors --.

Signed and sealed this 23rd day of May 1961.

(SEAL)
Attest:

ERNEST W. SWIDER            DAVID L. LADD
Attesting Officer            Commissioner of Patents